United States Patent Office 3,526,626
Patented Sept. 1, 1970

3,526,626
PHENYL SUBSTITUTED BICYCLIC HYDRO-
IMIDAZOLES AND HYDROPYRIDINES
William J. Houlihan, Mountain Lakes, N.J., assignor to
Sandoz-Wander, Inc., Hanover, N.J., a corporation of
Delaware
No Drawing. Continuation-in-part of application Ser. No.
505,968, Nov. 1, 1965. This application Dec. 18, 1968,
Ser. No. 784,882
Int. Cl. C07d 51/46
U.S. Cl. 260—251                    6 Claims

ABSTRACT OF THE DISCLOSURE

Phenyl substituted bicyclic hydroimidazoles and hydropyridines, e.g., 8a-phenyl-1,2,3,5,6,7,8,8a-octahydro imidazo[1,2-a]pyridine, are prepared by reduction of a corresponding ketone using a hydride such as lithium aluminum hydride. These compounds are useful as anti-inflammatory agents.

This application is a continuation-in-part of application Ser. No. 505,968, filed Nov. 1, 1965 now abandoned.

The present invention is directed to pharmaceutically acceptable compounds having the following basic ring structure:

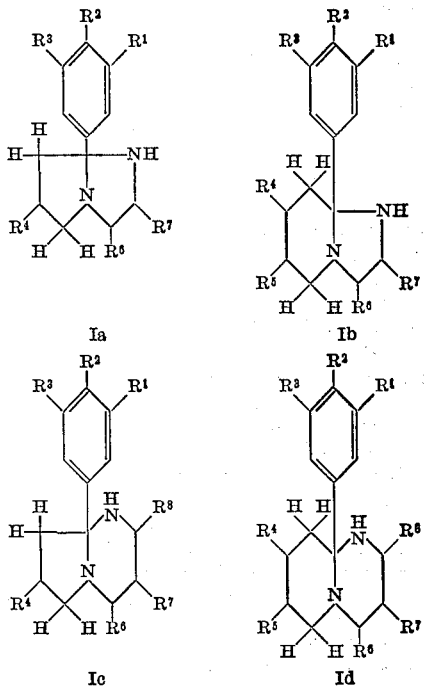

wherein each of $R^1$, $R^2$ and $R^3$ is, independently, either a hydrogen atom (—H); lower straight chain alkyl, preferably having from 1 to 4 carbon atoms, e.g., methyl, ethyl, propyl and butyl; or a chlorine atom (—Cl); and each of $R^4$, $R^5$, $R^6$, $R^7$ and $R^8$ is, independently, either a hydrogen atom (—H); or lower straight chain alkyl, preferably methyl, ethyl, propyl or butyl;
and to the method for preparing said compounds. The compounds include pharmaceutically acceptable acid addition salts, optically active and geometric, i.e. cis- and trans-, isomers.

Compounds I are prepared by reducing the corresponding compound II with a hydride, e.g. lithium aluminum hydride, reducing agent, in an ether, e.g. diethylether, dibutylether and tetrahydrofuran (THF), solvent according to the following reaction:

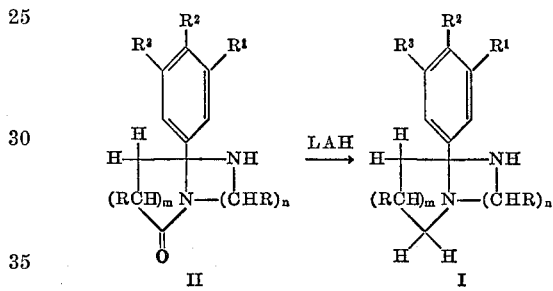

wherein each R is, independently, either a hydrogen atom (—H), methyl, ethyl, propyl or butyl;
each of $R^1$, $R^2$ and $R^3$ has its above-ascribed meaning, as it does throughout the instant text;
$m$ is either 1 or 2; and
$n$ is either 2 or 3.

This reaction proceeds at room temperature (20° C.), but reflux is preferred.

Compounds II are prepared by a number of methods. The reaction schemes for two of these methods follow:

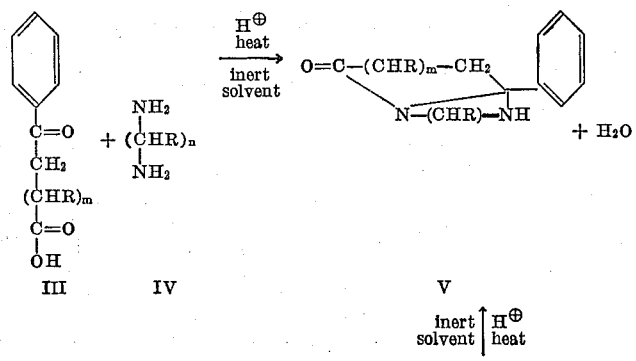

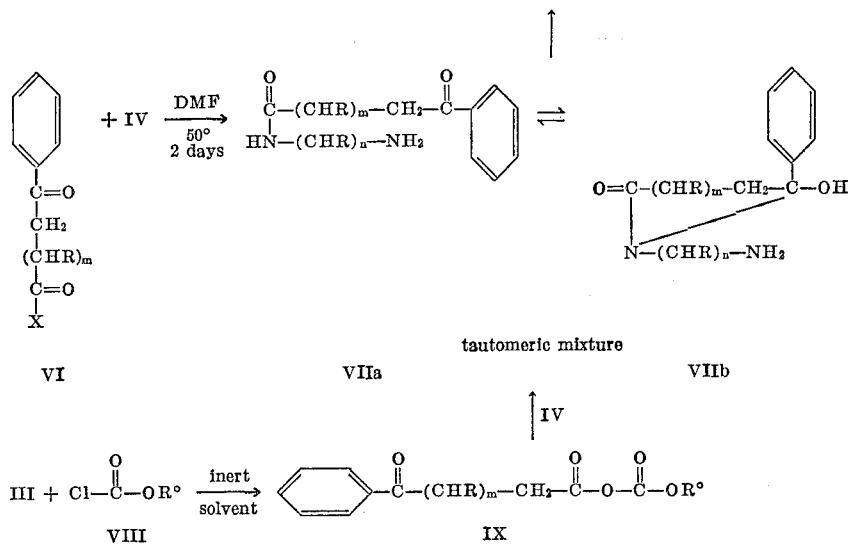

wherein:

R° is lower alkyl, preferably having from 1 to 4 carbon atoms, e.g. methyl, ethyl, propyl, isopropyl and butyl; and X is either a chlorine atom (—Cl) or a bromine atom (—Br).

The tautomeric mixture VII is seperated into its chemical individuals by known procedures, but such separation is not required to prepare compounds V or other compounds II. Said methods are independent of $R^1$, $R^2$ and $R^3$.

When compound IV is unsymmetrically substituted, a mixture of products V (or products VII) may result, since both amino groups are reactive.

The reaction of III with an alkyl chloroformate (alkyl chlorocarbonate) VIII is effected in an inert solvent, e.g. toluene and diethylether, at a temperature range from —10° to 100° C., preferably within the range of from —10° to 50° C. Stirring may be employed, but is not required.

For the noted reaction scheme only a catalytic amount of hydrogen ions is needed, as indicated. This is provided by a catalytic quantity of, e.g., para-toluenesulfonic acid. The inert solvent is any solvent, e.g. xylene, which is inert to both the reactants and the reaction products under the employed conditions. The heat that is indicated may vary, but reflux conditions are preferred. Compounds III, IV, VI and VIII are either known compounds or are readily prepared from available compounds by methods well-known to the art-skilled.

The classes of compounds within the scope of this invention are:

I*a* 7a-phenyl-2,3,5,6,7,7a-hexahydro-pyrrolo[1,2-a] imidazoles;

I*b* 8a-phenyl-1,2,3,5,6,7,8,8a-octahydro-imidazo[1,2-a] pyridines;

I*c* 8a-phenyl-1,2,3,4,6,7,8,8a-octahydro-pyrrolo[1,2-a] pyrimidines; and

I*d* 9a-phenyl-1,2,3,4,7,8,9,9a-octahydro-6H-pyrido[1,2-a] pyrimidines.

Among the pharmaceutically acceptable acid addition salts are salts of organic acids, e.g. tartaric acid; inorganic acids, e.g. hydrochloric acid, hydrobromic acid and sulfuric acid; monobasic acids, e.g. an alkanesulfonic acid ($H_3C$—$SO_3H$); dibasic acids, e.g., succinic acid; tribasic acids, e.g., phosphoric acid and citric acid; saturated acids, e.g., acetic acid, ethylenically unsaturated acids, e.g., maleic acid and fumaric acid; and aromatic acids, e.g., salicylic acid and arylsulfonic acids, such as benzenesulfonic acid. The only limitation on the acid selected is that the resulting acid addition salt be pharmaceutically acceptable; the acid does not nullify the therapeutic properties of compounds I. Preparing an acid addition salt from a free base and freeing a base from an acid addition salt thereof are established processes well-known to the art-skilled.

Compounds I have at least one asymmetric center, i.e., the carbon atom to which the phenyl group is bonded, and therefore exist as racemates or as optical antipodes (enantiomers). When any of $R^4$ to $R^8$ is other than a hydrogen atom, an additional asymmetric center exists. The optically active isomers and mixtures of same are within the scope of this invention. Resolution of the racemate of compound I into its optically active components is effected according to procedures well-known to the art-skilled and, per se, is not essential to this invention.

Compounds I are therapeutically active and are useful as anti-inflammatory agents and may be used effectively against bursitis as indicated by their activity in rats given 250 mg./kg. orally and tested using the carrageenan-induced edema method described by Winter (Proc. Soc. Exp. Biol., 111: 544, 1962), and in rats given 100 mg./kg. orally and tested using the method of Aston (Toxicol. and Appl. Pharmacol., 1: 277, 1959). The compounds may be effectively administered orally or parenterally at a daily dosage of 0.5–250 mg./kg. and can be administered to large mammals at a daily dose of from 40 to 500 milligrams.

Each of the pharmaceutically active compounds of this invention may be, e.g., incorporated, for oral administration, in a tablet as the sole active ingredient. A typical tablet is constituted by from 1 to 3 percent binder, e.g., tragacanth; from 3 to 10 percent disintegrating agent, e.g., corn starch; from 2 to 10 percent lubricant, e.g., talcum; from 0.25 to 1.0 percent lubricant, e.g., magnesium stearate; an average dosage of active ingredient; and q.s. 100 percent of filler, e.g., lactose; all percentages being by weight. Tablets are prepared according to standard tabletting techniques, which are well-known in the art, employing the necessary amounts of conventional granulating liquids, e.g., alcohol SD–30 and purified water. An exemplary tabletting formulation for the instant active compounds is:

|  | Parts |
|---|---|
| Title compound of Example 6 | 35 |
| Tragacanth | 2 |
| Lactose | 54.5 |
| Corn starch | 5 |
| Talcum | 3 |
| Magnesium stearate | 0.5 |
| Alcohol SD–30, Purified water, q.s. | |

In the examples which follow, the parts and percentages are by weight unless otherwise specified, and the temperatures are in degrees centigrade. The relationship between parts by weight and parts by volume is the same as that bewteen the kilogram and the liter.

EXAMPLE 1

8a-phenyl-1,2,3,4,6,7,8,8a-octahydro-pyrrolo[1,2-a]pyrimidin-6-one

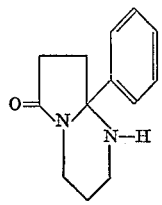

Charge a flask (equipped with a stirrer, heating mantle, condenser and a Dean-Stark tube) with 8.9 parts (0.05 mole) of 3-benzoylpropionic acid, 7.2 parts (0.1 mole) of 1,3-diaminopropane, 0.5 part of para-toluenesulfonic acid and 250 parts by volume of xylene. Stir and reflux until water ceases to separate in the Dean-Stark tube. Remove the solvent (xylene) on a rotary evaporator. Distill the resultant oil through a Claisen head to obtain an oil which solidifies on standing. Recrystallize the solid from isopropanol to obtain 4.1 parts of title compound, melting point (M.P.) 132° to 132.5°.

Replacing the 1,3-diaminopropane with an equivalent of either 1,3-diamino-2-ethylpropane or 1,3-diamino-1,3-dimethylpropane results in the preparation, in similar manner, of the corresponding compound IIc.

EXAMPLE 2

9a-phenyl-1,2,3,4,7,8,9,9a-octahydro-6H-pyrido[1,2-a]pyrimidin-6-one

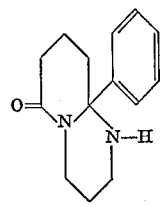

Charge a flask (equipped with a stirrer, heating mantle, condenser and a Dean-Stark tube) with 19.2 parts (0.10 mole) of 4-benzoylbutyric acid, 8.6 parts (0.12 mole) of 1,3-diaminopropane, 0.5 part of p-toluenesulfonic acid and 150 parts by volume of xylene. Stir and reflux the contents of the flask until water ceases to separate in the Dean-Stark tube. Remove the solvent on a rotary evaporator. Distill the resultant oil through a Claisen head to obtain an oil that solidifies on standing. Recrystallize the solid from ethyl acetate to obtain 2.4 parts of title compound, M.P. 140° to 141°.

Replacing the 4-benzoylbutyric acid with an equivalent of either 4-benzoyl-2-(or 3-)methylbutyric acid or 4-benzoyl-2-(or 3)ethylbutyric acid results in the preparation, in similar manner, of the corresponding compound IId.

EXAMPLE 3

8a-phenyl-1,2,3,5,6,7,8,8a-octahydro-imidazo[1,2-a]pyridin-5-one

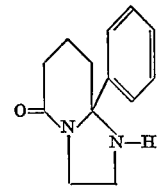

Charge a flask (equipped with a stirrer, heating mantle, condenser and a Dean-Stark tube) with 19.2 parts (0.1 mole) of γ-benzoylbutyric acid, 12.0 parts (0.2 mole) of 1,2-diaminoethane, 1 part of paratoluenesulfonic acid, and 150 parts by volume of xylene. Stir and reflux the contents of the flask until water ceases to separate in the Dean-Stark tube. Remove the solvent on a rotary evaporator. Distill the resultant oil through a Claisen head to obtain an oil that solidifies on standing.

Dissolve the resultant oil in ethyl acetate. Admix the resulting solution with charcoal before removing the ethyl acetate in vacuo. The title compound is thus obtained.

Replacing the γ-benzoylbutyric acid with an equivalent of either 4 - (3,5 - dimethylbenzoyl)butyric acid or 4-p-chlorobenzoylbutyric acid results in the preparation, in similar manner, of the corresponding compound IIb.

EXAMPLE 4

7a-phenyl-2,3,5,6,7,7a-hexahydro-1H-pyrrolo[1,2-a]imidazol-5-one

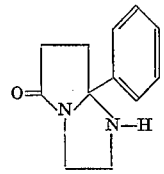

Charge a flask (equipped with a stirrer, heating mantle, condenser and a Dean-Stark tube) with 17.8 parts (0.1 mole) of 3-benzoylpropionic acid, 12.0 parts (0.2 mole) of ethylenediamine, 1.0 part of para-toluenesulfonic acid and 500 parts by volume of toluene. Stir and reflux until water ceases to separate in the Dean-Stark tube. Remove the solvent (toluene) on a rotary evaporator. Distill the resultant oil through a Claisen head to obtain an oil which solidifies on standing. Recrystallize the solid from isopropanol to obtain 2.9 parts of title compound, M.P. 129° to 130°.

Replacing the 3-benzoylpropionic acid with an equivalent of either 3-p-methylbenzoylpropionic acid or 3-benzoyl-2-methylpropionic acid results in the preparation, in the same manner, of the corresponding compound IIa. Replacing the ethylenediamine with an equivalent of either 1,2-diamopropane or 2,3-diaminobutane results in the preparation, in similar manner, of the corresponding compound IIa.

EXAMPLE 5

7a-phenyl-2,3,5,6,7,7a-hexahydro-1H-pyrrolo[1,2-a]imidazole hydrochloride

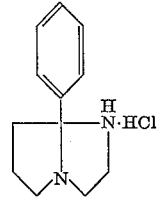

Equip a four-neck round bottom flask with a stirring apparatus, dropping funnel, reflux condenser, Soxhlet tube and a gas inlet tube. Charge the Soxhlet tube with 15.0 parts (0.074 mole) of the title compound of Example 4 and the flask with 7.1 parts (0.19 mole) of lithium aluminum hydride (LAH) and 500 parts by volume of anhydrous diethylether. Blanket the mixture in the flask with nitrogen before stirring and refluxing same for 18 hours.

Cool the thus-refluxed material with an ice bath and then add to said material 50 parts by volume of ethyl acetate, 10 parts by volume of 2 N (aq) sodium hydroxide and 15 parts by volume of water. Add anhydrous sodium sulfate to the thus-obtained crude salt mixture. Filter the salts from the resultant.

Remove the ether from the filtrate in vacuo on a rotary evaporator to obtain 14.3 parts of the free base of the title compound as an oil. Dissolve the oil in dry diethylether, cool the resulting solution in an ice bath and pass a stream of hydrogen chloride gas through the thus-cooled solution. Filter off the crude title compound which is thus precipitated, and recrystallize same from methanol/isopropanol. There are thus obtained 8.2 parts of title compound, M.P. 140° to 143°.

Replacing the title compound of Example 4 with an equivalent of either 7a - p - tolyl-2,3,5,6,7,7a-hexahydro-1H-pyrrolo[1,2-a]imidazol - 5 - one, 6 methyl-7a-phenyl-2,3,5,6,7,7a-hexahydro - 1H - pyrrolo[1,2-a]imidazol-5-one, 2-(or 3)methyl - 7a - phenyl-2,3,5,6,7,7a-hexahydro-1H-pyrrolo[1,2-a]imidazol-5-one or 2,3-dimethyl - 7a-phenyl-2,3,5,6,7,7a - hexahydro - 1H - pyrrolo[1,2-a]imidazol-5-one results in the preparation, in similar manner, of the corresponding compound Ia.

EXAMPLE 6

9a-phenyl-1,2,3,4,7,8,9,9a-octahydro-6H-pyrido[1,2-a]pyrimidine hydrochloride

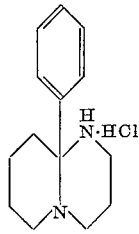

Equip a four-neck round bottom flask with a stirring apparatus, dropping funnel, reflux condenser, Soxhlet tube and a gas inlet tube. Charge the Soxhlet tube with 15.0 parts (0.065 mole) of 9a-phenyl-1,2,3,4,7,8,9,9a-octahydro-6H-pyrido[1,2-a]pyrimidin - 6 - one and the flask with 6.1 parts (0.163 mole) of LAH and 750 parts by volume of anhydrous diethylether. Blanket the mixture in the flask with nitrogen before stirring and refluxing same for 19 hours.

Cool the thus-refluxed material with an ice bath and then add to said material 12.4 parts by volume of 2 N (aq) sodium hydroxide and 18.6 parts by volume of water. Add anhydrous sodium sulfate to the thus-obtained crude salt mixture. Filter the salts from the resultant.

Remove the ether from the filtrate in vacuo on a rotary evaporator to obtain 13.4 parts of the free base of the title compound. Dissolve the free base in dry diethylether, cool the resulting solution in an ice bath and pass a stream of hydrogen chloride gas through the thus-cooled solution. Filter off the title compound which is thus precipitated to obtain 17.4 parts of the title compound, which is very hygroscopic.

Replacing the title compound of Example 2 with an equivalent of either 7-(or 8-)methyl-9a-phenyl-1,2,3,4,7,8,9,9a-octahydro-6H-pyrido[1,2-a]pyrimidin-6-one or 7-(or 8-)ethyl-9a-phenyl-1,2,3,4,7,8,9,9a-octahydro-6H-pyrido[1,2-a]pyrimidin-6-one, results in the preparation, in similar manner, of the corresponding compound Id.

EXAMPLE 7

8a-phenyl-1,2,3,5,6,7,8,8a-octahydro-imidazo[1,2-a]pyridine hydrochloride

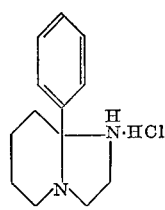

Equip a four-neck round bottom flask with a stirring apparatus, dropping funnel, reflux condenser, Soxhlet tube and a gas inlet tube. Charge the Soxhlet tube with 25.0 parts (0.116 mole) of 8a-phenyl-1,2,3,5,6,7,8,8a-octahydro-imidazo[1,2-a]pyridin-5-one and the flask with 11.0 parts (0.29 mole) of LAH and 750 parts by volume of anhydrous diethylether. Blanket the mixture in the flask with nitrogen before stirring and refluxing same for 19 hours.

Cool the thus-refluxed material with an ice bath and then add to said material 22 parts by volume of 2 N (aq) sodium hydroxide and 33 parts by volume of water. Add anhydrous sodium sulfate to the thus-obtained crude salt mixture. Filter the salts from the resultant.

Remove the ether from the filtrate in vacuo on a rotary evaporator to obtain 22.2 parts of the free base, M.P. 66° to 70°, of the title compound. Dissolve 10 parts of the free base in dry diethylether, cool the resulting solution in an ice bath and pass a stream of hydrogen chloride gas through the thus-cooled solution. Filter off the title compound which is thus precipitated to obtain 13.8 parts of very hygroscopic title compound.

Replacing the title compound of Example 3 with an equivalent of either 8a-(3,5-dimethylphenyl)-1,2,3,5,6,7,8,8a-octahydro-imidazo[1,2-a]pyridin-5-one or 8a-p-chlorophenyl - 1,2,3,5,6,7,8,8a - octahydro - imidazo[1,2 - a]pyridin-5-one results in the preparation, in similar manner, of the corresponding compound Ib.

EXAMPLE 8

8a-phenyl-1,2,3,4,6,7,8,8a-octahydro-pyrrolo[1,2-a]pyrimidine hydrochloride

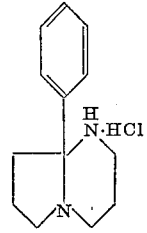

Equip a four-neck round bottom flask with a stirring apparatus, dropping funnel, reflux condenser, Soxhlet tube and a gas inlet tube. Charge the Soxhlet tube with 25.0 parts (0.116 mole) of 8a-phenyl-1,2,3,4,6,7,8,8a-octahydro-pyrrolo[1,2-a]pyrimidin-6-one and the flask with 11.0 parts (0.29 mole) of LAH and 750 parts by volume of anhydrous diethylether. Blanket the mixture in the flask with nitrogen before stirring and refluxing same for 18 hours.

Cool the thus-refluxed material with an ice bath and then add to said material 22 parts by volume of 2 N (aq) sodium hydroxide and 33 parts by volume of water. Add anhydrous sodium sulfate to the thus-obtained crude salt mixture. Filter the salts from the resultant.

Remove the ether from the filtrate in vacuo on a rotary evaporator to obtain 23.2 parts of the free base of the title compound. Dissolve the free base in dry diethylether, cool the resulting solution in an ice bah and pass a stream of hydrogen chloride gas through the thus-cooled solution. Filter off the title compound which is thus precipitated to obtain 19.7 parts of very hygroscopic title compound.

Replacing the title compound of Example 1 with an equivalent of either 3-ethyl-8a-phenyl-1,2,3,4,6,7,8,8a-octahydro-pyrrolo[1,2-a]pyrimidin-6-one or 2,4-dimethyl-8a - phenyl - 1,2,3,4,6,7,8,8a - octahydro - pyrrolo[1,2-a]pyrimidin-6-one results in the preparation, in similar manner, of the corresponding compound Ic.

What is claimed is:
1. A process for preparing a compound of the formula

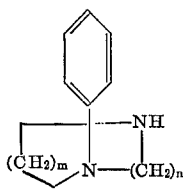

where:

$m$ is one of the integers 1 and 2; and
$n$ is one of the integers 2 and 3, which comprises reducing with hydride reducing agent in inert atmosphere and ether solvent at a temperature of about room temperature to reflux temperature the corresponding compound of the formula:

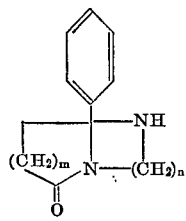

where $m$ and $n$ are defined above.

2. A therapeutically active and pharmaceutically acceptable compound which, in its free base form, is of the formula:

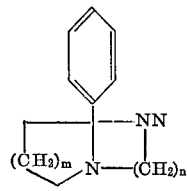

where:

$m$ is one of the integers 1 and 2; and
$n$ is one of the integers 2 and 3.

3. The compound according to claim 2 which is 7a-phenyl-2,3,5,6,7,7a-hexahydro-pyrrolo[1,2-a]imidazole.

4. The compound according to claim 2 which is 8a-phenyl-1,2,3,5,6,7,8,8a-octahydro-imidazo[1,2-a]pyridine.

5. The compound according to claim 2 which is 8a-phenyl - 1,2,3,4,6,7,8,8a - octahydro-pyrrolo[1,2 - a]pyrimidine.

6. The compound according to claim 2 which is 9a-phenyl - 1,2,3,4,7,8,9,9a - octahydro - 6H - pyrido[1,2-a]pyrimidine.

References Cited

Shapiro et al., J. Org. Chem. 26, 818–20 (1961).

ALEX MAZEL, Primary Examiner

R. V. RUSH, Assistant Examiner

U.S. Cl. X.R.

260—296, 309.7; 424—251, 263, 273